United States Patent
Kho et al.

(10) Patent No.: US 9,512,961 B2
(45) Date of Patent: Dec. 6, 2016

(54) FILTER BRACKET MOUNT FOR EXISTING ANTENNA POLE MOUNT

(71) Applicant: Cisco Technology, Inc., San Jose, CA (US)

(72) Inventors: ChuanKeat Kho, San Jose, CA (US); Steven A. Granzella, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/572,896

(22) Filed: Dec. 17, 2014

(65) Prior Publication Data

US 2016/0178115 A1    Jun. 23, 2016

(51) Int. Cl.
| | |
|---|---|
| *F16M 13/00* | (2006.01) |
| *F16M 13/02* | (2006.01) |
| *F16M 11/00* | (2006.01) |
| *H01Q 1/12* | (2006.01) |
| *H01Q 1/24* | (2006.01) |
| *H04W 88/08* | (2009.01) |

(52) U.S. Cl.
CPC .............. *F16M 13/02* (2013.01); *F16M 11/00* (2013.01); *H01Q 1/12* (2013.01); *H01Q 1/1228* (2013.01); *H01Q 1/246* (2013.01); *H04W 88/08* (2013.01)

(58) Field of Classification Search
CPC .......... F16M 13/02; F16M 11/00; H01Q 1/12; H01Q 1/1207; G09F 2007/1804; G09F 2007/1808; G09F 2007/1813
USPC ................ 248/219.4, 218.4, 219.3, 200, 300
See application file for complete search history.

(56) References Cited

U.S. PATENT DOCUMENTS

| | | | | |
|---|---|---|---|---|
| 4,917,338 A | * | 4/1990 | Olson | F21V 21/116 248/214 |
| 6,262,691 B1 | * | 7/2001 | Austin | H01Q 1/1221 343/878 |
| 7,866,616 B2 | * | 1/2011 | Wen | F16M 11/04 248/219.1 |
| 7,918,425 B2 | * | 4/2011 | Rathbone | H01Q 1/1228 248/228.1 |
| 7,997,546 B1 | * | 8/2011 | Andersen | F16B 2/06 248/214 |
| 8,683,909 B1 | * | 4/2014 | Copus | F41A 23/16 182/127 |
| 8,794,578 B2 | * | 8/2014 | Lin | H01Q 1/1228 248/218.4 |
| 9,132,787 B2 | * | 9/2015 | Cooper | B60R 11/02 |
| 2002/0196195 A1 | * | 12/2002 | Vermette | H01Q 1/125 343/882 |

(Continued)

FOREIGN PATENT DOCUMENTS

| | | |
|---|---|---|
| JP | 2012178802 A | 9/2012 |
| WO | 2014138292 A1 | 9/2014 |

OTHER PUBLICATIONS

International Search Report dated Mar. 8, 2016 cited in Application No. PCT/US2015/065055, 13 pgs.

*Primary Examiner* — Anita M King
(74) *Attorney, Agent, or Firm* — Merchant & Gould P.C.

(57) ABSTRACT

A mounting system may be provided. The mounting system may comprise a first device mounting bracket. In addition, the mounting system may comprise a plurality of first device mounting bracket fasteners attached to the first device mounting bracket. A second device mounting bracket may also be included that may attach to ones of the plurality of first device mounting bracket fasteners.

24 Claims, 5 Drawing Sheets

(56) References Cited

U.S. PATENT DOCUMENTS

| | | | |
|---|---|---|---|
| 2007/0132655 A1* | 6/2007 | Lin | H01Q 1/125 343/880 |
| 2010/0288897 A1* | 11/2010 | Chang | G09F 7/18 248/229.22 |
| 2012/0223200 A1* | 9/2012 | Cooper | B60R 11/02 248/309.1 |
| 2012/0261529 A1 | 10/2012 | Lettkeman | |
| 2014/0103184 A1 | 4/2014 | Asrokin et al. | |

* cited by examiner

FILTER BRACKET MOUNT FOR EXISTING ANTENNA POLE MOUNT

TECHNICAL FIELD

The present disclosure relates generally to a bracket, specifically, to a filter bracket mount for an existing antenna pole mount.

BACKGROUND

An antenna is an electrical device that converts electric power into radio waves, and vice versa. It is usually used with a radio transmitter in transmission or a radio receiver in reception. In transmission, the radio transmitter supplies an electric current oscillating at a radio frequency (e.g., a high frequency alternating current (AC)) to the antenna's terminals. The antenna then radiates the energy from the current as electromagnetic waves (radio waves). In reception, the antenna intercepts some of the power of an electromagnetic wave in order to produce a tiny voltage at its terminals that is applied to the receiver to be amplified. Antennas are components of most equipment that uses radio. They are used in systems such as radio broadcasting, broadcast television, two-way radio, communications receivers, radar, cell phones, and satellite communications.

In conjunction with an antenna, a filter may be used on signals sent or received by the antenna. One such filter may comprise a band-stop filter. In signal processing, a band-stop filter (i.e., band-rejection filter) is a filter that passes most frequencies unaltered, but attenuates those in a specific range to very low levels. A band-stop filter is the opposite of a band-pass filter. A notch filter is a band-stop filter with a narrow stopband. A notch filter may be used in conjunction with an antenna.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1:
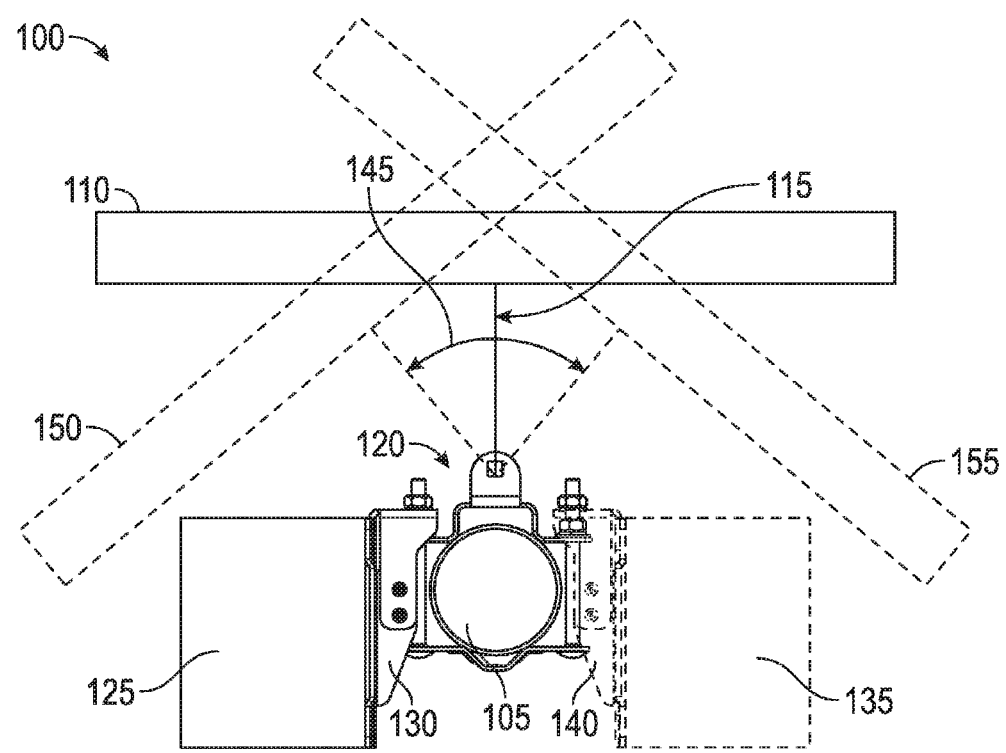
FIG. 1 shows a mounting system.

A mounting system may be provided. The mounting system may comprise a first device mounting bracket. In addition, the mounting system may comprise a plurality of first device mounting bracket fasteners attached to the first device mounting bracket. A second device mounting bracket may also be included that may attach to ones of the plurality of first device mounting bracket fasteners.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A panel antenna may comprise a type of directional antenna used in broadcast engineering, for example, to obtain a wireless Internet connection. Directional antennas may receive and transmit a signal in one specific direction, which may allow for a better signal. This antenna type may use wave guide technology to focus ingoing and outgoing radio signals into a focused, effective signal by concentrating the signals' energy. A panel antenna may be similar to a sector antenna, which may comprise a directional antenna used in telecommunications for cell phone connectivity and wireless Internet.

Moreover, panel antennas may be used in the developing world to increase the range and capability of wireless Internet networks. Under optimal conditions for signal broadcast and setup, a panel antenna may extend wireless connectivity up to 10 miles. In the United States and many other countries around the world, caution may be exercised that the panel antenna that is being used is compliant with regulations related to allowed amount of signal output.

In conjunction with an antenna (e.g., a panel antenna), there may be a need to install a filter (e.g., a cavity notch filter) together with the panel type antenna. The filter may filter a signal transmitted from the antenna. The filter may pass most frequencies unaltered, but may attenuate those frequencies in a specific range to very low levels, for example. The filter, for example, may comprise a notch filter. A notch filter may comprise a band-stop filter with a narrow stopband.

The antenna may be mounted on a pole. The filter may also be mounted on the pole along with the antenna. With conventional systems, two separate and complete pole mount brackets may be used, one to install the antenna on the pole and the other to install the filter on the pole. Since each item (e.g., the antenna and the filter) may occupy respective sections of the pole, this conventional system may require significant vertical space on the pole. However, there may be limited vertical space on the pole making the vertical space on the pole valuable for installing other communication devices.

Furthermore, it may be more costly when the antenna and filter are mounted at different vertical locations on the pole. For example, using two separate pole mount brackets may be more costly because one set of pole mount brackets may be needed for the antenna and another set of pole mount brackets may be needed for the filter. Moreover, when the antenna and filter are mounted at different vertical locations on the pole, there may be a need for a longer antenna cable to connect the antenna and the filter. The longer cable may not only add more cable cost, but may also deteriorate the radio frequency (RF) performance of the system as a whole.

With conventional systems, the antenna may be installed on the pole using an antenna mounting bracket. Similarly, with conventional systems, the filter may be installed on the pole using a conventional filter mounting bracket. Consequently, with conventional systems, two complete sets of mounting brackets may be used along with considerable cable lengths and vertical pole space.

To address these issues, embodiments of the disclosure may provide a filter mounting bracket that may be installed in the same vertical poll space as the antenna mounting bracket and that may utilize portions of the antenna mounting bracket already attached to the pole. Moreover, embodiments of the disclosure may provide a filter mounting bracket that may be able to retrofit into existing antenna mounting brackets. In addition, embodiments of the disclosure may provide a filter mounting bracket that may allow the antenna to swing and to be able to withstand, for example, the standard IEC 61850 shock and vibration test and IEEE 1613 shock and vibration test.

FIG. 1 shows a mounting system 100. As shown in FIG. 1, mounting system 100 may comprise a mount 105 (e.g., a pole), a first device 110 (e.g., an antenna), a first device arm 115 (e.g., an antenna arm), and a first device mounting bracket 120 (e.g., an antenna mounting bracket). Mounting system 100 may also include a second device 125 (e.g., a filter), a second device mounting bracket 130, a third device 135, and a third device mounting bracket 140.

Mount 105 may comprise a pole or other device on which first device 110 may be mounted. First device 110 may comprise an antenna, for example, a panel antenna. A panel antenna is a type of directional antenna used in radio broadcasting, for example, to obtain a wireless Internet connection. Directional antennas receive and transmit a signal in one specific direction, which allows for a better signal by directing ingoing and outgoing radio signals into a focused, effective signal by concentrating their energy. Second device 125 and third device 135 may comprise, but are not limited to, a filter, an amplifier, a junction box, another antenna, a surveillance device, a camera, a lighting device, a compact size router, a switch, or a radio frequency (RF) range extender.

In order to point first device 110 (e.g., a panel antenna), first device arm 115 may swing through a swing angle 145 from a first device second position 150 to a first device third position 155. As will described in greater detail below, first device arm 115 may attached to first device mounting bracket 120 in such a way to allow first device arm 115 to swing at the attachment point were first device arm 115 attaches to first device mounting bracket 120. Swing angle 145 may comprise, but is not limited to 80 degrees.

As shown in FIG. 1, second device mounting bracket 130 and third device mounting bracket 140 may be attached to first device mounting bracket 120. Since each item (i.e., first device 110, second device 125, and third device 135) may accommodate the same vertical section of mount 105, significant vertical space on mount 105 may be saved, thus freeing up vertical space on mount 105 for other items. Because there may be limited vertical space on mount 105, the vertical space on mount 105 may be valuable for installing other communication devices on mount 105.

Moreover, when first device 110, second device 125, and third device 135 are mounted in the same vertical space on mount 105, cables connecting first device 110, second device 125, and third device 135 may be shorter than if first device 110, second device 125, and third device 135 were mounted in different vertical spaces on mount 105. Consequently, the cost of longer cables may be saved along with the cost of fixing deterioration of the radio frequency (RF) performance caused by longer cables. Furthermore, the cost of first device mounting bracket 120, second device mounting bracket 130, and third device mounting bracket 140 may be cheaper than brackets to mount first device 110, second device 125, and third device 135 at different vertical spaces on mount 105.

Second device mounting bracket 130 and third device mounting bracket 140 may have an "L" shape. This "L" shape may allow second device 125 and third device 135 to be tucked beside mount 105 and away from first device 110 so that second device 125 and third device 135 may not interfere with first device 110 as it swings through swing angle 145.

Furthermore, second device mounting bracket 130 (and third device mounting bracket 140) may be designed with two orientations so that it can be installed on either side of first device mounting bracket 120. In other words, mounting system 100 may include one or both of second device mounting bracket 130 and third device mounting bracket 140. Moreover, second device mounting bracket 130 and third device mounting bracket 140 may be interchangeably mounted to first device mounting bracket 120.

Figure 2:
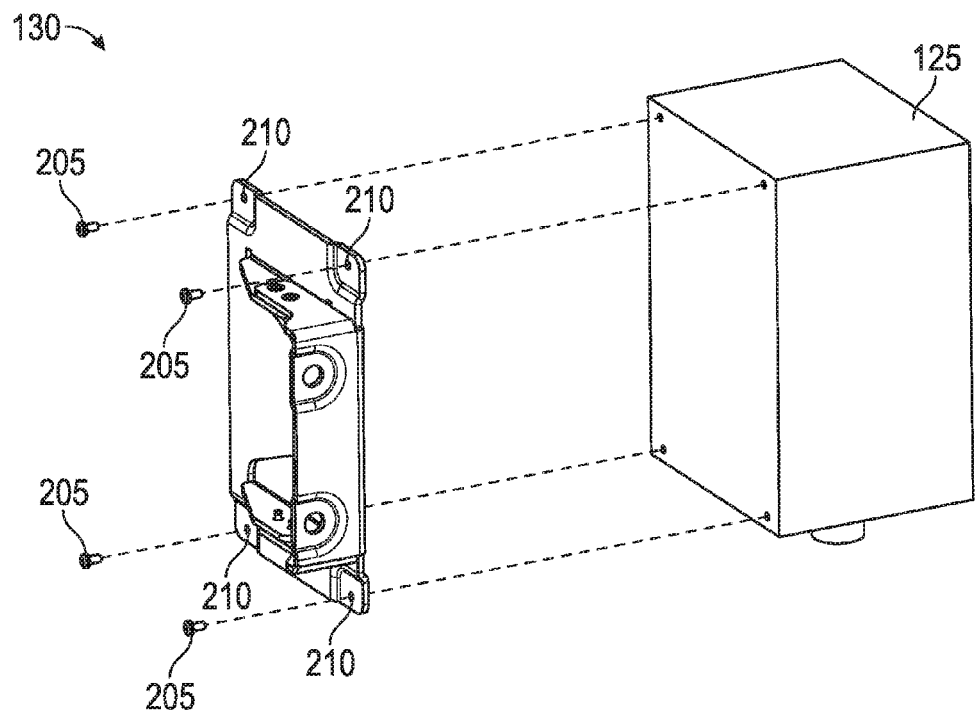
FIG. 2 shows a second device mounting bracket.

FIG. 2 shows second device mounting bracket 130. As shown in FIG. 2, second device mounting bracket 130 may comprise a plurality of second device mounting bracket fasteners holes 210. A plurality of second device mounting bracket fasteners 205 may pass into respective ones of second device mounting bracket fasteners holes 210 to fasten second device mounting bracket 130 to second device 125. Third device mounting bracket 140 may fasten to third device 135 in a similar way. Plurality of second device mounting bracket fasteners 205 may comprise, but are not limited to, screws, rivets, and pins.

Figure 3A:
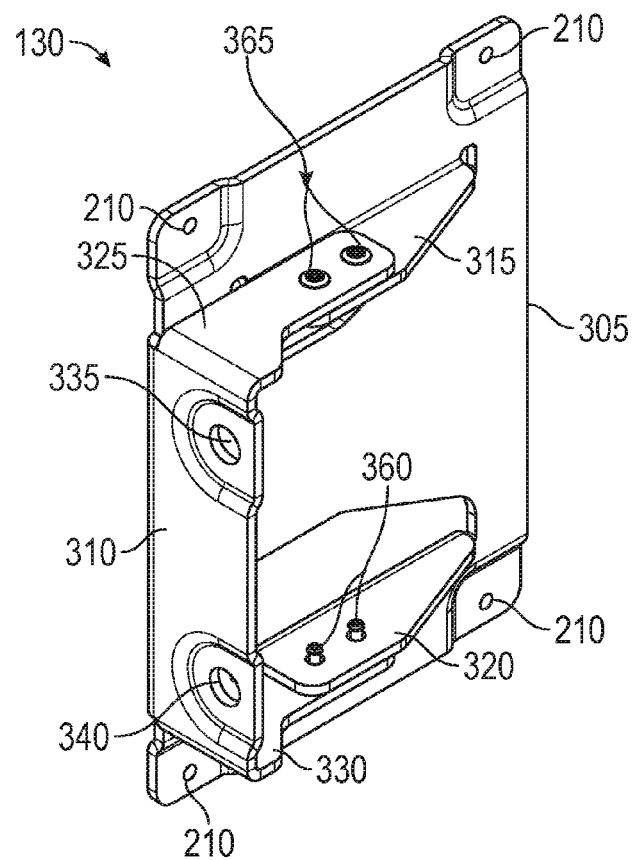
FIG. 3A, FIG. 3B, and FIG. 3C show a second device mounting bracket.
Figure 3B:
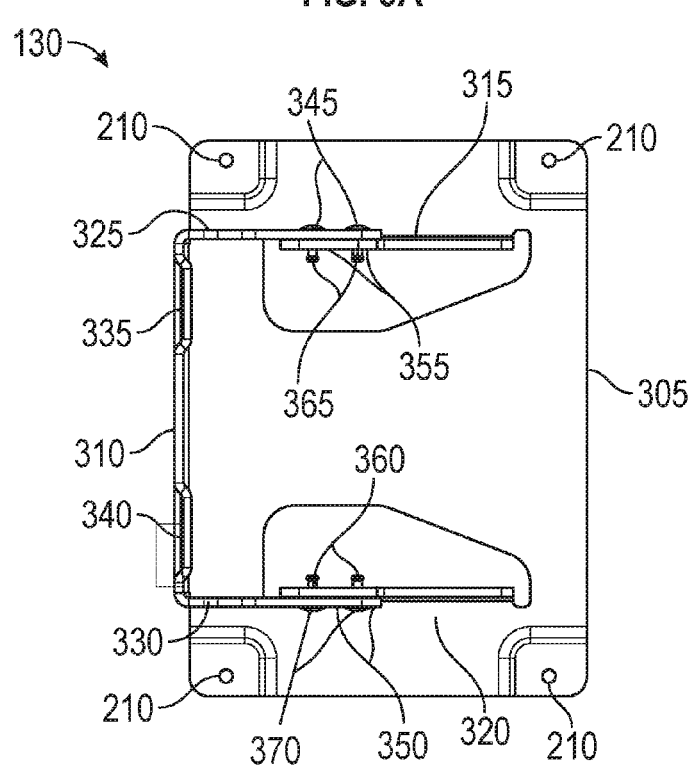
Figure 3C:
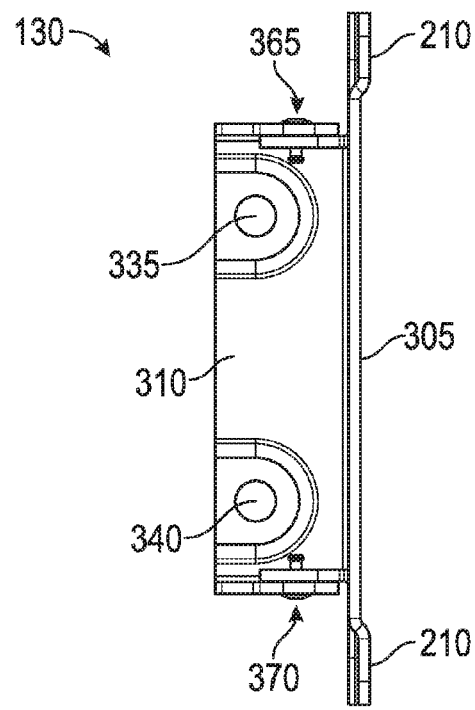

FIG. 3A, FIG. 3B, and FIG. 3C show second device mounting bracket 130 in more detail. Third device mounting bracket 140 may be similar to second device mounting bracket 130. As shown in FIG. 3A, FIG. 3B, and FIG. 3C, second device mounting bracket 130 may comprise a plate 305, a front flange 310, a first flange 315, and a second flange 320. Front flange 310 may comprise a first wing 325, a second wing 330, a first front flange hole 335, and a second front flange hole 340. First wing 325 may include first wing rivet holes 345 and second wing 330 may include second wing rivet holes 350. First flange 315 may include a plurality of first flange rivet holes 355 including a first plurality of rivets 365. Similarly, second flange 320 may comprise a plurality of second flange rivet holes 360 including a second plurality of rivets 370.

Figure 4:
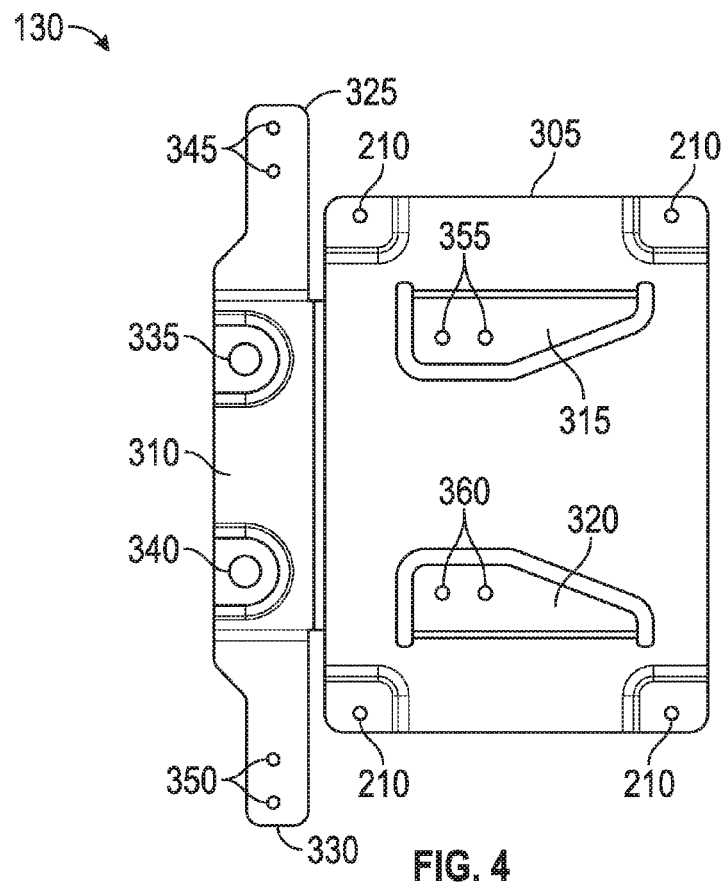
FIG. 4 shows a second device mounting bracket.

FIG. 4 shows second device mounting bracket 130 in a flattened state before it is bend and riveted to the form shown in FIG. 3A, FIG. 3B, and FIG. 3C. As shown in FIG. 4, mounting bracket 130 may be machine stamped from, for example, 2.5 mm thick 304 stainless steel to withstand high load stresses and avoid corrosion since second device mounting bracket 130 may be installed in the outdoor environments. To add strength, embosses may be added around first front flange hole 335, second front flange hole 340, and plurality of second device mounting bracket fasteners holes 210.

Front flange 310, first flange 315, and second flange 320 may each be bent up from plate 305 at substantially 90 degrees. First wing 325 and second wing 330 may each be bend down from front flange 310 at substantially 90 degrees to be adjacent to first flange 315 and second flange 320 respectively to where first wing rivet holes 345 align with plurality of first flange rivet holes 355 and second wing rivet holes 350 align with plurality of second flange rivet holes 360. Once the aforementioned rivet holes are aligned, first plurality of rivets 365 may be placed in first wing rivet holes 345 and plurality of first flange rivet holes 355 to fasten first wing 325 to first flange 315. Similarly, second plurality of rivets 370 may be placed in second wing rivet holes 350 and plurality of second flange rivet holes 360 to fasten second wing 330 to second flange 320.

Figure 5:
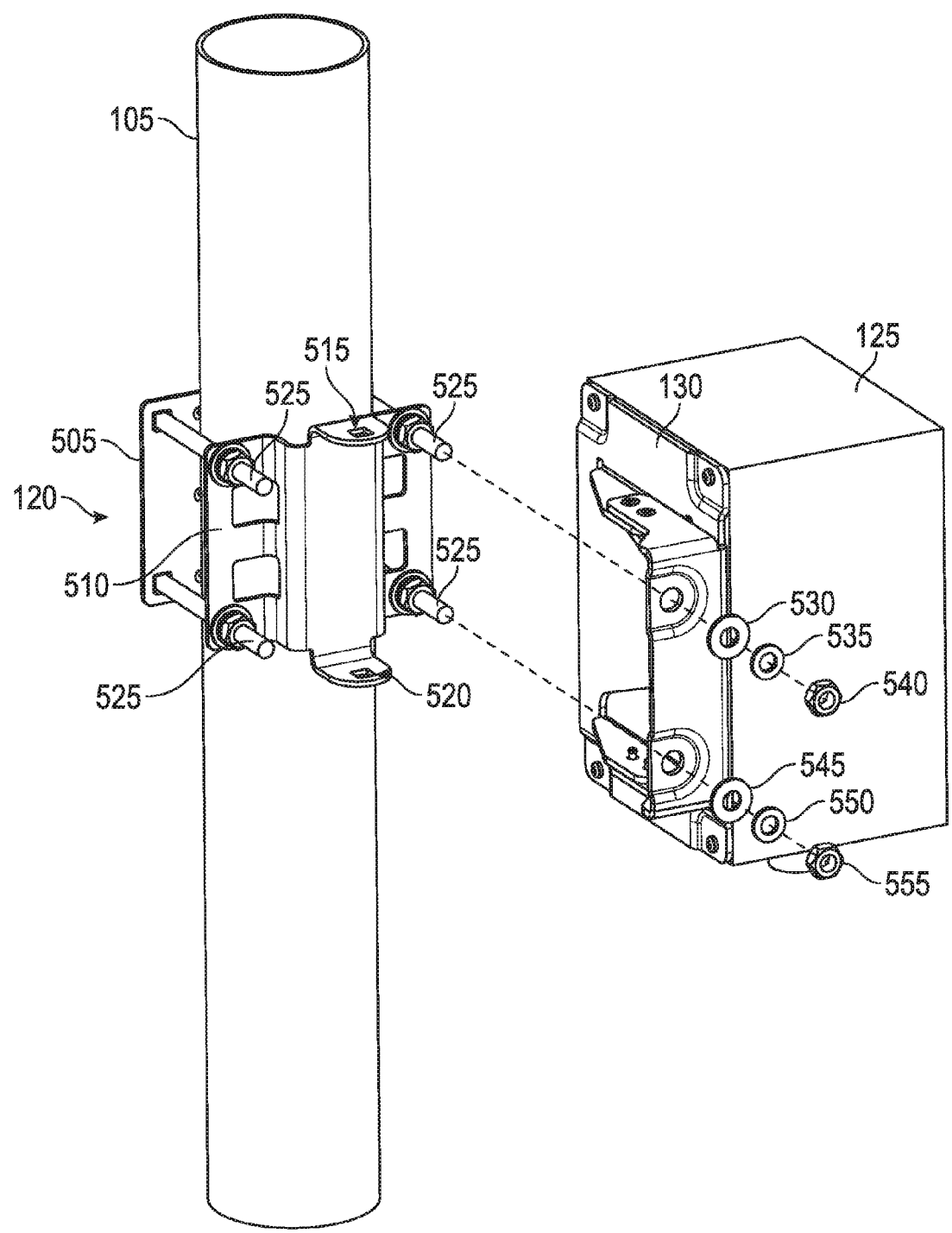
FIG. 5 shows a second device mounting bracket mounted to a first device mounting bracket.

FIG. 5 shows first device mounting bracket 120 in more detail. As shown in FIG. 5, first device mounting bracket 120 may comprise a first device mounting bracket back plate 505 and a first device mounting bracket front plate 510. First device mounting bracket front plate 510 may comprise a first device mounting bracket top flange 515 and a first device mounting bracket bottom flange 520. First device mounting bracket back plate 505 and first device mounting bracket front plate 510 may attach to each other around mount 105 via a plurality of first device mounting bracket fasteners 525. Plurality of first device mounting bracket fasteners 525 may comprise a plurality of nuts and bolts, when tightened, force first device mounting bracket back plate 505 and first device mounting bracket front plate 510 snuggly and tightly against mount 105. First device mounting bracket top flange 515 and first device mounting bracket bottom flange 520 may provide attachment points for first device arm 115 and facilitate the aforementioned swing of first device arm 115.

As shown in FIG. 5, once second device mounting bracket 130 is formed and attached to second device 125, second device mounting bracket 130 (along with second device 125) may be attached to first device mounting bracket 120. Second device mounting bracket 130 may utilize, as shown in FIG. 5, either side of two out of four bolt patterns (e.g., of plurality of first device mounting bracket fasteners 525) on first device mounting bracket 120. First front flange hole 335 and second front flange hole 340 of second device mounting bracket 130 may go onto two horizontal (e.g., two of plurality of first device mounting bracket fasteners 525) of first device mounting bracket 120. As shown in FIG. 5, second device mounting bracket 130 may be secured to two of first device mounting bracket 120's plurality of first device mounting bracket fasteners 525, for example, via a first flat washer 530, a first spring washer 535, and a first nut 540 for one of plurality of first device mounting bracket fasteners 525 and via a second flat washer 545, a second spring washer 550, and a second nut 555 for another one of plurality of first device mounting bracket fasteners 525.

Figure 6:
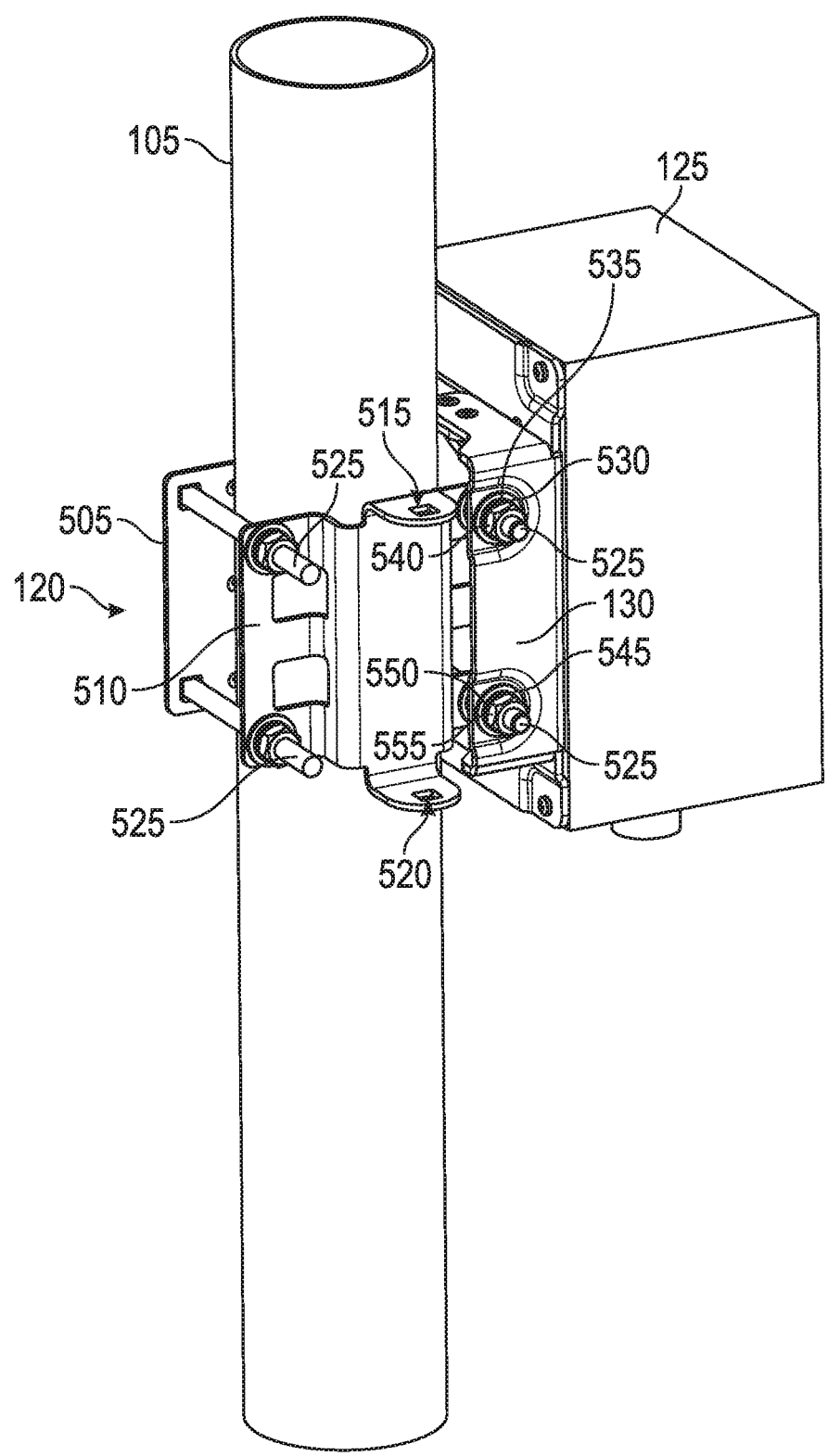
FIG. 6 shows a second device mounting bracket mounted to a first device mounting bracket.

FIG. 6 shows second device mounting bracket 130 from FIG. 5 mounted to first device mounting bracket 120. As shown in FIG. 6, first flat washer 530, first spring washer 535, and first nut 540 may be snuggly installed in system 100. Similarly, second flat washer 545, second spring washer 550, and second nut 555 may be snuggly installed in system 100.

Consistent with embodiments of the disclosure, the aforementioned embosses may provide stiffness to second device mounting bracket 130 enough, for example, to minimize deflection and avoid mounting system 100 from becoming lose during shock and vibration tests. Furthermore, the aforementioned bending and riveting may create, for example, triangular ribs that may increase stiffness at the bend of the aforementioned "L" shape. This may keep the "L" shape from collapsing under stress. As a result, second device mounting bracket 130's stiffness may be increased.

Consistent with embodiments of the disclosure, second device mounting bracket 130 may be capable of retrofitting into bolts of existing antenna pole mount brackets to save valuable vertical pole space, mounting hardware, time of assembly, costs (i.e., less mounting hardware and shorter cables), and also increase system RF performance (e.g., from shorter cables). Second device mounting bracket 130 may comprise an "L" shape to allow second device 125 to be tucked beside and away so that it may avoid interfering with first device 110 through swing angle 145.

First device mounting bracket 120 may comprise plurality of first device mounting bracket fasteners 525, for example, in a 2×2 bolt mounting pattern (e.g., two vertically aligned on the left side of mount 105 and two vertically aligned on the right side of mount 105.) Second device mounting bracket 130 may utilizes only two of plurality of first device mounting bracket fasteners 525 from first device mounting bracket 120 as a point of anchor for second device 125. As a result, second device mounting bracket 130 may be installed either on the left or on the right side of mount 105 or both second device mounting bracket 130 and third device mounting bracket 140 may be installed on mount 105's sides at the same time.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. An apparatus comprising:
   a first device mounting bracket comprising,
      a first device mounting bracket front plate comprising,
         a first device mounting bracket top flange, and
         a first device mounting bracket bottom flange, and
      a first device mounting bracket back plate;
   a plurality of first device mounting bracket fasteners attached to the first device mounting bracket;
   a second device mounting bracket attached to ones of the plurality of first device mounting bracket fasteners; and
   a first device arm being connected to the first device mounting bracket between the first device mounting bracket top flange and the first device mounting bracket bottom flange, the first device arm being configured to swing between the first device mounting bracket top flange and the first device mounting bracket bottom flange.

2. The apparatus of claim 1, wherein the first device mounting bracket is attached to a mount.

3. The apparatus of claim 2, wherein the mount comprises a pole.

4. The apparatus of claim 3, wherein the first device mounting bracket and the second device mounting bracket occupy substantially the same vertical space on the pole.

5. The apparatus of claim 1, further comprising a first device being connected to the first device arm.

6. The apparatus of claim 1, further comprising a second device being connected to the second device mounting bracket.

7. The apparatus of claim 1, wherein the second device mounting bracket comprises:
a plate;
a first flange extending from the plate;
a second flange extending from the plate; and
a front flange extending from the plate, the front flange having a first wing and a second wing, the first wing being adjacent to the first flange and the second wing being adjacent to the second flange.

8. The apparatus of claim 7, further comprising a plurality of second device mounting bracket fasteners holes disposed in the front flange, the plurality of second device mounting bracket fasteners holes being configured to align with the plurality of first device mounting bracket fasteners.

9. The apparatus of claim 7, further comprising:
a plurality of first flange rivet holes in the first flange;
a plurality of first wing rivet holes in the first wing wherein the plurality of first flange rivet holes and plurality of first wing rivet holes are aligned;
a first plurality of rivets being disposed in the plurality of first flange rivet holes and extending through the plurality of first wing rivet holes;
a plurality of second flange rivet holes in the second flange;
a plurality of second wing rivet holes in the second wing wherein the plurality of second flange rivet holes and plurality of second wing rivet holes are aligned; and
a second plurality of rivets being disposed in the plurality of second flange rivet holes and extending through the plurality of second wing rivet holes.

10. A system comprising:
a first device mounting bracket comprising;
a first device mounting bracket back plate, and
a first device mounting bracket front plate;
a plurality of first device mounting bracket fasteners connecting the first device mounting bracket back plate with the first device mounting bracket front plate;
a second device mounting bracket comprising:
a plate,
a first flange extending from the plate,
a second flange extending from the plate, and
a front flange extending from the plate, the front flange having
a first wing being adjacent to the first flange,
a second wing being adjacent to the second flange, and
a plurality of second device mounting bracket fasteners holes disposed in the front flange, the plurality of second device mounting bracket fasteners holes being aligned with the plurality of first device mounting bracket fasteners; and
a second device being connected to the second device mounting bracket, the second device comprising one of the following: a filter; an amplifier; a junction box; an antenna; a camera; a lighting device; a compact size router; a switch; and a radio frequency (RF) range extender.

11. The system of claim 10, further comprising:
a first device arm being connected to the first device mounting bracket; and
a first device being connected to the first device arm, the first device comprising an antenna.

12. An apparatus comprising:
a first device mounting bracket;
a plurality of first device mounting bracket fasteners attached to the first device mounting bracket; and
a second device mounting bracket attached to ones of the plurality of first device mounting bracket fasteners wherein the second device mounting bracket comprises;
a plate,
a first flange extending from the plate,
a second flange extending from the plate, and
a front flange extending from the plate, the front flange having a first wing and a second wing, the first wing being adjacent to the first flange and the second wing being adjacent to the second flange.

13. The apparatus of claim 12, wherein the first device mounting bracket is attached to a mount.

14. The apparatus of claim 13, wherein the mount comprises a pole.

15. The apparatus of claim 14, wherein the first device mounting bracket and the second device mounting bracket occupy substantially the same vertical space on the pole.

16. The apparatus of claim 12, wherein the first device mounting bracket comprises:
a first device mounting bracket back plate; and
a first device mounting bracket front plate.

17. The apparatus of claim 16, wherein the first device mounting bracket front plate comprises:
a first device mounting bracket top flange; and
a first device mounting bracket bottom flange.

18. The apparatus of claim 17, further comprising a first device arm being connected to the first device mounting bracket between the first device mounting bracket top flange and the first device mounting bracket bottom flange, the first device arm being configured to swing between the first device mounting bracket top flange and the first device mounting bracket bottom flange.

19. The apparatus of claim 18, further comprising a first device being connected to the first device arm.

20. The apparatus of claim 12, further comprising a second device being connected to the second device mounting bracket.

21. The apparatus of claim 12, further comprising a plurality of second device mounting bracket fasteners holes disposed in the front flange, the plurality of second device mounting bracket fasteners holes being configured to align with the plurality of first device mounting bracket fasteners.

22. The apparatus of claim 12, further comprising:
a plurality of first flange rivet holes in the first flange;
a plurality of first wing rivet holes in the first wing wherein the plurality of first flange rivet holes and plurality of first wing rivet holes are aligned;
a first plurality of rivets being disposed in the plurality of first flange rivet holes and extending through the plurality of first wing rivet holes;
a plurality of second flange rivet holes in the second flange;
a plurality of second wing rivet holes in the second wing wherein the plurality of second flange rivet holes and plurality of second wing rivet holes are aligned; and
a second plurality of rivets being disposed in the plurality of second flange rivet holes and extending through the plurality of second wing rivet holes.

23. A system comprising:
a first device mounting bracket comprising;
a first device mounting bracket back plate, and
a first device mounting bracket front plate;

a plurality of first device mounting bracket fasteners connecting the first device mounting bracket back plate with the first device mounting bracket front plate; and a second device mounting bracket comprising:
- a plate,
- a first flange extending from the plate,
- a second flange extending from the plate, and
- a front flange extending from the plate, the front flange having a first wing being adjacent to the first flange, a second wing being adjacent to the second flange, and
- a plurality of second device mounting bracket fasteners holes disposed in the front flange, the plurality of second device mounting bracket fasteners holes being aligned with the plurality of first device mounting bracket fasteners;

a first device arm being connected to the first device mounting bracket; and a first device being connected to the first device arm, the first device comprising an antenna.

24. The system of claim 23, further comprising a second device being connected to the second device mounting bracket, the second device comprising one of the following: a filter; an amplifier; a junction box; an antenna; a camera; a lighting device; a compact size router; a switch; and a radio frequency (RF) range extender.

\* \* \* \* \*